UNITED STATES PATENT OFFICE.

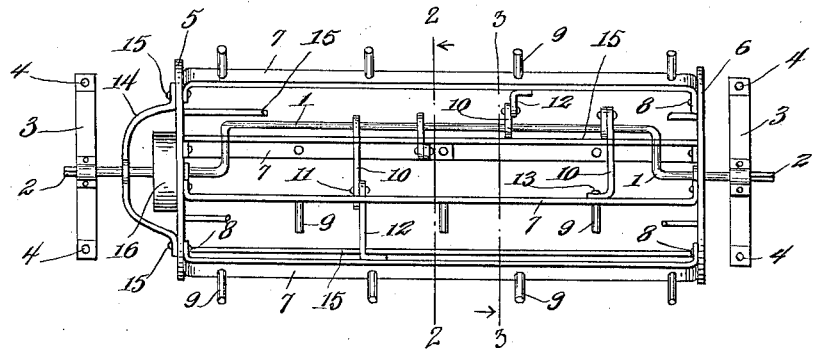

JOHN L. TORSKE, OF PLUMMER, MINNESOTA.

BEATER FOR THRESHERS.

1,093,216.   Specification of Letters Patent.   Patented Apr. 14, 1914.

Application filed February 21, 1913. Serial No. 749,934.

*To all whom it may concern:*

Be it known that I, JOHN L. TORSKE, a citizen of the United States, residing at Plummer, in the county of Red Lake and State of Minnesota, have invented new and useful Improvements in Beaters for Threshers, of which the following is a specification.

My present invention relates broadly to separators for threshing machines and has particular reference to that portion or part of such a machine commonly known as the "beater" or "thresher."

The primary object of the invention is to provide simple and efficient means capable of performing the usual functions now required of a beater or thresher without utilizing the numerous mechanical elements now employed, thus materially reducing the cost of manufacture.

Another object of the invention is to provide a simplified thresher or beater wherein the rotary motion necessary to operation, is generated and imparted to the beater in a novel and peculiar manner, without decreasing or in any way affecting the utility of the device.

A further object of the invention is to provide a plurality of pivotally mounted beater or thresher bars connected to the shaft of a device in such a manner as to oscillate or turn, thereby beating and threshing the grain as it passes beneath.

With the above and other objects in view, my invention relates to such details of construction and in the arrangement and combination of the several parts as will be hereinafter fully described and specifically pointed out in the appended claims.

In describing my invention in detail references will be had to the accompanying drawings wherein like characters denote like or corresponding parts throughout the several views, and in which:—

Figure 1 is an elevation of the device. Fig. 2 is a section on line 2—2 of Fig. 1. Fig. 3 is a section on line 3—3 of Fig. 1. Fig. 4 is an end view, and Fig. 5 is an end view of the beater, a portion of the separator in connection with which it is used being shown in section, and the operating shaft of the beater being also shown in section.

Referring now more particularly to the drawings wherein is illustrated the preferred form of my invention the numeral 1 designates a crank shaft, terminating at each end in a head 2, angular in cross section and mounted upon brackets 3 secured as at 4 to the separator of the threshing machine (not shown). By the provision of this angular head 2 a rotation of the shaft 1 is prevented, the purpose of which will hereinafter appear.

A beater is mounted upon the shaft between the brackets 3 and comprises a pair of spaced apart cylindrical plates 5 and 6 respectively which form the heads of the beater. These plates 5 and 6 are loosely mounted upon the shaft and connected through the medium of a plurality of beater bars 7, substantially U-shaped, and pivotally mounted as at 8 to each plate. Each bar is provided with a series of projections 9 secured in any suitable manner upon the outer face thereof which serve as teeth or crushers during the operation of the device. The means employed for imparting movement to the bar 7 includes a link 10 loosely mounted upon the crank shaft 1 and pivoted as at 11 to a similar link 12 pivotally mounted as at 13 to one of the bars 7. Each bar 7 is connected in a manner similar to that just described.

A bracket 14 is secured as at 15 to the plate 5 within which the shaft 1 is journaled. This bracket not only forms a bearing for the shaft but also provides a casing or guard for a pulley 16 formed integral with or secured upon the outer face of the said plate 5, by means of which the rotary motion is imparted to the device through the medium of a belt 17 driven by any suitable power.

The crank shaft 1 being stationary, and the plates 5 and 6 being rotated by reason of the pulley 16, it will be seen that the beater bars 7 are oscillated or turned upon their pivots 8 to various positions thus working the projections 9 and causing the same to crush or disintegrate the grain as it passes beneath the device. The links 10 and 12 being pivotally secured as at 11 will permit a turning of the beater frame independent of the shaft or links imparting oscillatory or erratic movement to the beater bars.

It will be seen from the foregoing, taken in connection with the accompanying drawings that the operation of the device is simple in the extreme, that the many gears and other mechanical elements used in connection with a thresher or beater as at present constructed are avoided or obviated to a great extent; and that the construction has been greatly simplified and the cost of manufacture reduced to a minimum.

It is thought from the foregoing that the advantages and novel features of my invention will be readily comprehended.

I desire it to be understood that I may make slight changes in the construction and in the arrangement and combination of the several parts, provided such changes fall within the scope of the subjoined claims.

Having thus fully described my invention, what I claim as new and desire to secure by Letters Patent, is:—

1. A beater for threshing machines including a stationary crank shaft, a frame bodily rotatable thereupon, and means connecting said shaft to certain of the frame elements for independently moving said elements during bodily rotation of said frame.

2. A beater for threshing machines including a stationary shaft, a frame bodily rotatable upon said shaft, and means connecting said shaft to certain of the frame elements for oscillating said elements during bodily rotation of said frame.

3. A beater for threshing machines including a crank shaft, spaced apart plates rotatably mounted upon said shaft, beater bars connecting said plates, and a plurality of links connecting said shaft to the said bars for imparting motion to the latter.

4. A beater for threshing machines including a crank shaft, spaced apart plates rotatably mounted upon said shaft, beater bars pivoted to the said plates and forming a connection therebetween, a plurality of pivoted links connecting said shaft to the said bars for imparting movement to the latter.

5. A beater for threshing machines including a stationary crank shaft, plates rotatably mounted upon said shaft, means for imparting movement to one of said plates, beater bars connecting said plates, and means including a plurality of pivoted links for connecting said shaft and the said bars for imparting movement to the latter independent of the shaft.

6. A beater for threshing machines including a stationary crank shaft, plates rotatably mounted upon said shaft, means for imparting rotary movement to one of said plates, a plurality of beater bars pivotally mounted to the said plates and forming a connection therebetween, a plurality of pivoted links connecting the said shaft and the said beater bars for imparting movement to the latter independent of the shaft and a plurality of projections carried by the said bars, as and for the purpose set forth.

7. A beater for threshing machines including a stationary crank shaft, means for supporting said shaft in an immovable position, a pair of spaced apart plates mounted, one upon each end of said shaft, means for imparting rotary movement to one of said plates, a plurality of substantially U-shaped beater bars pivotally mounted upon the inner face of the said plates, and forming a connection therebetween, a plurality of projections formed upon the outer face of each bar, a plurality of links loosely mounted upon said shaft, a plurality of links pivotally mounted one to each beater bar, each of the said last mentioned links being pivotally connected to the said first mentioned links, for oscillating the bars during the rotation of the plates, and a bracket secured upon one of the said plates within which the said stationary shaft is journaled.

JOHN L. TORSKE.

Witnesses:
O. J. JOHNSON,
LAWRENCE JENSEN.

---

Copies of this patent may be obtained for five cents each, by addressing the "Commissioner of Patents, Washington, D. C."